United States Patent [19]
Klimek et al.

[11] 4,024,604
[45] May 24, 1977

[54] CLAMP

[75] Inventors: Boleslaw M. Klimek, Des Plaines; Victor Mastis, Hinsdale, both of Ill.

[73] Assignee: The Echlin Manufacturing Company, Branford, Conn.

[22] Filed: Feb. 23, 1976

[21] Appl. No.: 660,140

[52] U.S. Cl. .............................. 24/16 R; 248/74 PB
[51] Int. Cl.² ......................................... B65D 63/00
[58] Field of Search .............. 24/16, 16 PB, 81 CC, 24/279; 248/74 PB, 68

[56] References Cited
UNITED STATES PATENTS

| | | | |
|---|---|---|---|
| 3,421,187 | 1/1969 | Ryder | 248/74 PB |
| 3,893,647 | 7/1973 | Kennedy | 24/81 CC |

*Primary Examiner*—Werner H. Schroeder
*Assistant Examiner*—Doris L. Troutman
*Attorney, Agent, or Firm*—Neuman, Williams, Anderson & Olson

[57] ABSTRACT

A clamp is provided for securing a plurality of elongated articles in a spaced relationship; the clamp includes a base provided with standards which have recesses or wells therein and which mutually define a recess therebetween to accept such articles of a plurality of sizes. In addition the clamp includes a pair of straps, one of which is connected to the base at one end thereof and includes a tongue and fastening sections; the other strap is connected to the other end of the base and includes complementary channel and fastening sections for mating with the tongue and fastening section of the former strap.

24 Claims, 3 Drawing Figures

CLAMP

BACKGROUND OF THE INVENTION

This invention relates to clamps, and more particularly clamps of a type employed to hold a plurality of elongated articles in spaced relation.

In a modern tractor-trailer hookup the tractor is not only connected mechanically to the trailer but also electrically and pneumatically. More specifically, electrical wires or cables are provided to conduct electricity from the tractor to the trailer for a variety of purposes, including lighting the trailer; in addition, hoses or tubes associated with the pneumatic braking system of the trailer run between the tractor and the trailer. Generally, to keep these hoses, cables, tubes and wires from becoming entangled or damaged, they may be bundled together or held in a fixed relationship by various known clamping or retaining apparatus. Merely bundling of these articles together without maintaining them in a fixed relationship, however, may not prevent excessive relative motion between adjacent articles and the resulting frictional wear.

Employing clamps with fixed size wells or pockets to maintain the articles in a fixed relationship may be effective to prevent relative motion, but such clamps are not well adapted for use with various sizes of hoses, cables or wires. In addition, the need for employing a plurality of clamps to accommodate all of such hoses, wires and cables, and the possibility that each clamp may include a plurality of components may result in a great multiplicity of parts which may become disassociated, lost or broken.

OBJECTS OF THE INVENTION

Accordingly, it is an object of the present invention to provide an improved, low cost, and simplified clamp for holding or securing hoses or tubes, cables or wires of various sizes.

It is another object of this invention to provide a clamp which securely holds hoses or tubes, cables or wires of different diameters in spaced relation and which can be secured or released quickly.

It is still another object of this invention to provide a clamp of flexible, unitary construction and employing a ratchet locking apparatus for retaining hoses or tubes and cables or wires within the clamp.

SUMMARY OF THE INVENTION

These objects are achieved by a clamp according to the invention which includes a base provided with at least one standard or post; the standard is formed to at least partially define a plurality of recesses or wells, each recess or well suitable for receiving at least one elongated article therein. Connected to opposite ends of the base are straps having at their distal ends complementary coupling or locking elements. The straps are bendably adapted to overlie the base, with the complementary coupling or locking elements engaging to maintain the straps in the aforesaid overlying position.

In one illustrative embodiment of the invention a pair of standards are employed each containing a recess or well and forming a recess or well between them. Each of the standards cooperate with a corresponding one of the straps to define an additional well or recess. In addition the complementary coupling elements comprise a tongue portion with integral, ratchet teeth formed on one strap, and a securing channel on the other strap, provided with a pawl therein which receives the tongue portion therethrough, and engages the ratchet teeth.

Other objects, advantages and features of the invention will become apparent upon reading the following detailed description and appended claims, and upon reference to the accompanying drawings.

BRIEF DESCRIPTION OF THE DRAWINGS

For a complete understanding of this invention, reference should now be had to the embodiment illustrated in greater detail in the accompanying drawings and described below by way of an example of the invention.

IN THE DRAWINGS

Figure 1:
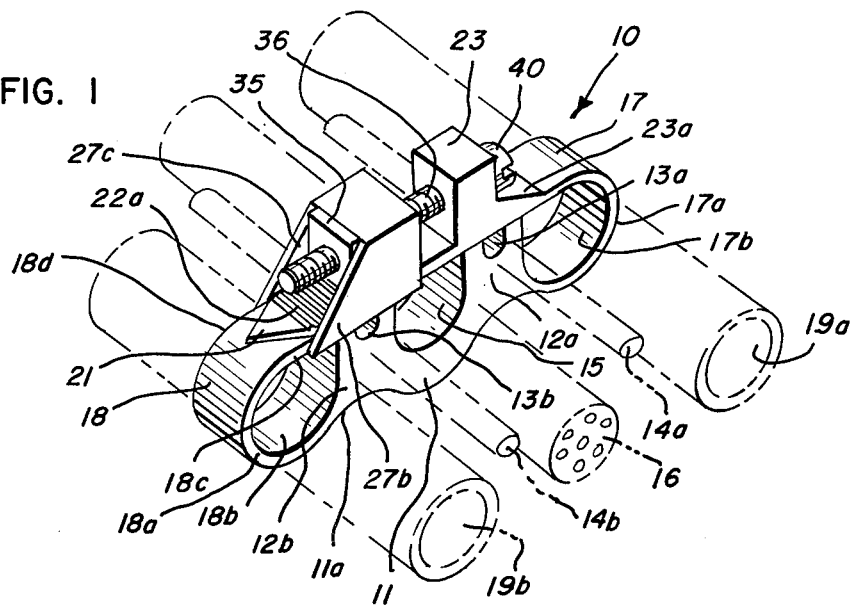
Figure 2:
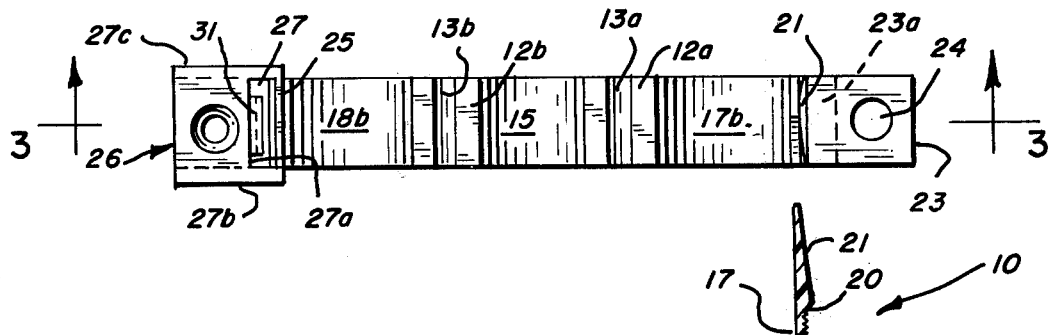
Figure 3:
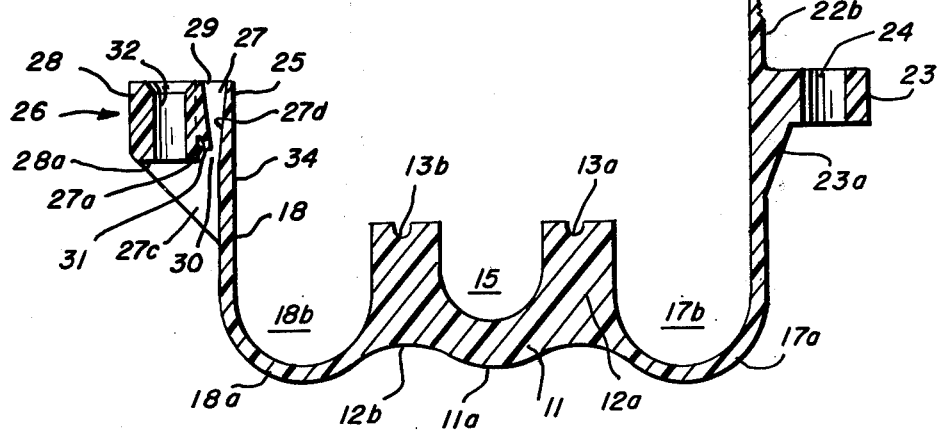

FIG. 1 is a perspective view of the preferred embodiment of a clamp embodying principles of this invention with hoses or tubes, wires and a cable shown in phantom therein;

FIG. 2 is a top plan view of the preferred embodiment of the clamp shown in FIG. 1, with the clamp in an open position; and FIG. 3 is a sectional view of the clamp shown in FIG. 2, taken along line 3—3.

While the invention will be described in connection with a preferred embodiment, it will be understood that it is not intended to limit the invention to that particular embodiment. On the contrary, it is intended to cover all alternatives, modifications and equivalents as may be included within the spirit and scope of the invention as defined by the appended claims.

DESCRIPTION OF THE PREFERRED EMBODIMENT

Turning now to the drawings and principally FIG. 1, the preferred embodiment of a clamp according to the invention is shown generally at 10. A base 11 of clamp 10 is provided with two uprights, posts, or standards 12a and 12b. Recesses or pockets 13a and 13b in the standards 12a and 12b are each generally of U-shape and of an appropriate size to accommodate wires 14a and 14b, shown in phantom (in FIG. 1), which run between a tractor and a trailer as above-described. A larger U-shaped recess or well 15 is formed in base 11 between standards 12a and 12b. Recess 15 is of size appropriate for accommodating a multiple wire cable 16, shown in phantom in FIG. 1, of a type used to conduct electrical signals between a tractor and a trailer. Integrally connected to the base 11 and positioned at opposite ends thereof, are straps 17 and 18 having arcuate portions 17a and 18a extending from the base 11, which together with the respective standards 12a and 12b forms wells 17b and 18b for accommodating therein a pair of larger dimension tubes or hoses 19a and 19b, as shown in phantom in FIG. 1. The hoses or tubes 19a and 19b, are contemplated to be such as provide service and supply pressure between a tractor and trailer. It may be noted that the wells or recesses each have a principal axis, aligned substantially laterally of the clamp 10 and parallel to each other.

It may also be noted that the recesses or wells 13a, 13b and 15 are at least partially semi-cylindrical in form and of dimensions such that the wires 14a and 14b and the cable 16 are not entirely contained within the respective recesses. Rather each recess in the preferred embodiment is of a depth at least equal to the radius of the wire or cable contained therein, but not greater than the diameter of the wire or cable. While it is contemplated that articles of various dimensions may be accommodated within the clamp 10, the relative sizes of the wells 13a, 13b, and wells 17b and 18b should be such that straps 17 and 18 lie substantially flatly across the exposed surfaces of standards 12a and 12b of base 11 when the clamp 10 is secured as described in more detail below, with articles 14a, 14b, 16, 19a and 19b in place as in FIG. 1.

Referring now principally to FIG. 3, at the distal end of the strap 17 is a tongue portion 20 including a beveled guide member 21; adjoining the guide member 21, is a locking element 22 including ratchet teeth 22a formed in a surface 22b thereof. Adjoining the locking element 22 is a fastening block portion 23 which also is an integral component of the strap 17 and protrudes outwardly beyond the surface 22b (as seen in FIG. 3) thereof. The fastening block portion 23 is provided with a laterally centered hole 24 therethrough which is adapted to accommodate a bolt 40 (FIG. 1); the block portion 23 also includes a reinforcing wedge-shaped buttress 23a which serves to increase the structural rigidity of the fastening block portion and to connect the block portion to the arcuate portion 17a.

At the distal end 25 of the strap 18 is a securing member 26 including a channel 27 and, outwardly of the channel 27 as seen in FIG. 3, a fastening block 28. The channel 27, as defined by outer and inner surfaces 27a and 27d, is inclined downwardly and outwardly as seen in FIG. 3 from an upper opening 29 to a lower opening 30. Extending into the channel 27 from an outer surface 27a thereof is a ratchet pawl 31. The ratchet pawl 31 extends downwardly and inwardly as seen in FIG. 3 into the channel 27 from the upper opening 29 thereof. The fastening block 28 includes a laterally centered, countersunk hole 32 therethrough and is adapted to accommodate the bolt 40 (FIG. 1). The hole 32 is of a countersunk design to increase the ease with which the bolt 40 may be inserted therethrough. Similarly, the hole 24 in fastening block 23 may optionally be countersunk. A pair of support ribs 27b and 27c extend angularly downwardly from block 28 as seen in FIGS. 1 and 2 and are integrally connected to the sides 18c and 18d of strap 18. The support ribs 27b and 27c reinforce the fastening block portion 28 and serve to prevent rotation of a nut 35 which may be placed adjacent a face 28a of the fastening block portion 28 to engage the bolt 40.

The clamp 10 is preferably molded from a flexible, yet sturdy, material, such as nylon, in the "open" position, as shown in FIG. 3. In the open position the straps 17 and 18 in the preferred embodiment extend away from the base 11 in a substantially parallel relation. That notwithstanding, the starps 17 and 18 are of such thickness that they may be bent inwardly to overlie the base 11; the base 11, however, is of substantially heavier construction than the straps 17 and 18 to prevent any significant deformation of the base 11 when the straps 17 and 18 are so bent. An undersurface 11a of the base 11 is of such arcuate shape as to maintain a desired minimum cross-section while utilizing a minimal amount of material to comprise the base and yet insuring sturdy construction.

In use, after the above described articles have been placed within the respective recesses or wells, the straps 17 and 18 are bent inwardly about the hoses 19a and 19b respectively so as to overlie the base 11 and the arcuate portions 17a and 18a of the straps. The tongue guide 21 contained on tongue portion 20 is inserted through opening 29 of the channel 27. As the tongue portion 20 moves through the channel 27, ratchet teeth 22a are engaged by the ratchet pawl 31. The ratchet pawl-teeth interlock prevents the strap 17 from being inadvertently withdrawn from the channel 27. As the straps 17 and 18 become taut, the arcuate portions 17a and 18a of the respective straps 17 and 18 bend to conform to the dimensions of a tube or hose 19a and 19b. At the same time, inner surfaces 33 and 34 of straps 17 and 18 (as seen in FIG. 3) engage the upper surfaces of wires 14a and 14b and cable 16 (FIG. 1) contained within recesses 13a, 13b and 15, respectively. Thus, when straps 17 and 18 are taut, surfaces 33 and 34 thereof force the wires and cable into the recesses and may come to be in supportive contact with standards 12a and 12b depending upon the tension of the straps and the relative sizes of the wires, cables and hoses; under these conditions the clamp is "closed".

In this configuration, openings 24 and 32 of the fastening portion 23 and fastening block 28 are in substantially coaxial alignment, as best shown in FIG. 1. The bolt 40 with optional stress-distributing washer (not shown) may then be inserted through openings 24 and 32 and may engage the aforementioned nut 35 which may be placed adjoining the fastening block 28; thereby, the clamp is further secured against inadvertent opening. In addition, a portion 36 of the bolt 40 between the fastening block portion 23 and fastening block 28 may serve as a bail-like member to suspend, hang or otherwise mount the clamp in a desired position or location.

Thus, a clamp is provided that is of a unitary and flexible construction, and is inexpensive to manufacture; yet the clamp is capable of securely maintaining a plurality of hoses or tubes, cables or wires in a fixed spaced relationship. While a particular embodiment of the invention has been shown, it will be understood, of course, that the invention is not limited thereto since modifications may be made and other embodiments of the principles of this invention will occur to those skilled in the art to which the invention pertains upon considering the foregoing teachings. For example, it is apparent that a clamp according to this invention may be employed to maintain in spaced relationship a plurality of hoses or tubes of various sides, a plurality of cables or wires of various sizes or a combination, as shown herein, of hoses or tubes, cables and wires. It is, therefore, contemplated by the appended claims to cover any such modification and other embodiments as incorporate those features which constitute the essential features of this invention whithin the true spirit and scope of the following claims.

What is claimed is:

1. A clamp for use in retaining a plurality of elongated tubular units in spaced relation comprising a base having a plurality of wells arranged in spaced relation, each well being adapted to receive one of such units; a first portion adjustably mounted on said base and partially defining one well; a second portion adjustably mounted on said base and partially defining a second well; and a sectional locking means having a first section carried on said first portion and a complemental second section carried on said second portion, said locking means being in interlocking relation when said first portion and said second portion assume a predetermined relative position whereby said wells partially defined by said portions conform to the tubular units retained therein and said portions cooperate with said base to securely retain all such units in said wells 2. The clamp of claim 1, wherein the axes of said wells are in spaced parallel relation.

3. In the clamp of claim 2, well sections of lesser dimension being spaced vertically from wells of greater dimension.

4. The clamp of claim 1, wherein posts integral with, and protruding from, said base between adjacent wells are provided.

5. In the clamp of claim 4, said posts extending from the base of said wells and being integral therewith.

6. In the clamp of claim 4, said posts extending to a height intermediate the radius and diameter of a unit to be contained within a well.

7. In the clamp of claim 4, said posts extending so as to supportedly engage said first and second sections when said portions assume their predetermined relative position.

8. The clamp of claim 1, wherein said first section of said sectional locking means includes an elongated serrated tongue-like portion.

9. A clamp for use in retaining a plurality of elongated tubular units in spaced relation comprising a base having a plurality of wells arranged in spaced relation, each well being adapted to receive one of such units; a first portion adjustably mounted on said base adjacent one well and including a fastening means protruding from said first portion, being provided with an opening therein to receive a bolt; a second portion adjustably mounted on said base adjacent a second well; and a sectional locking means having a first section carried on said first portion and a complemental second section carried on said second portion, said locking means being in interlocking relation when said first portion and said second portion assume a predetermined relative position whereby said portions cooperate with said base to securely retain such units in said wells.

10. In the clamp of claim 9, said fastening means being spaced from said elongated portion.

11. In the clamp of claim 8, said second section of said sectional locking means including a channel to receive said elongated serrated tongue-like portion, when said first and second portions are in a predetermined relation.

12. A clamp for use in retaining a plurality of elongated tubular units in spaced relation comprising a base having a plurality of wells arranged in spaced relation, each well being adapted to receive one of such units; a first portion adjustably mounted on said base adjacent one well; a second portion adjustably mounted on said base adjacent a second well; and sectional locking means having a first section carried on said first portion and a complemental second section carried on said second portion, said locking means being in interlocking relation when said first portion and said second portion assume a predetermined relative position, said first section of said sectional locking means including an elongated serrated tongue-like portion, and said second section including a channel to receive said serrated tongue-like portion and said second section including within said channel a ratchet member which interlocks with said serrated tongue-like portion when said first and second portions are in a predetermined relation whereby said portions cooperate with said base to securely retain such units in said wells.

13. In the clamp of claim 9, said second portion of said clamp including a second fastening means protruding from second portion and provided with an opening therein to receive a bolt.

14. In the clamp of claim 13, the opening of said second fastening means being in substantial coaxial alignment with said opening of said first fastening means when said first and second portions of said clamp are in a predetermined relation.

15. In the clamp of claim 11, said second fastening means being integral with said channel in said second section of said sectional locking means.

16. A clamp comprising a base having standard means formed therein for at least partially defining a plurality of wells, each adapted to receive an elongated article therein, first strap means adjustably connected to a first end of said base for cooperating with said standard means to define at least one of said wells, second strap means adjustably connected to the second end of said base for cooperating with said standard means to define at least one of said wells, said first and second strap means being adapted to overlie said base and said wells and including coupling means adapted for maintaining said strap means in such overlying position.

17. In the clamp of claim 16, said standard means comprising two standards with at least one well-formed there-between.

18. The clamp of claim 17, wherein one of said wells is formed in each of said standard means.

19. The clamp of claim 16, wherein each of said wells in said base is generally semi-cylindrical in shape, and adapted to at least partially contain elongated articles placed therein.

20. A clamp comprising a base having standard means formed therein for at least partially defining a plurality of wells, each adapted to receive an elongated article therein, first strap means connected to a first end of said base for cooperating with said standard means to define at least one of said wells, second strap means connected to the second end of said base for cooperating with said standard means to define at least one of said wells, said first and second strap means being adapted to overlie said base and said wells, said wells being adapted to contain elongated articles of different dimension such that said first and second means flatly overlie said base when in an overlying position, and said first and second strap means including coupling means adapted for maintaining said strap means in such overlying position.

21. The clamp of claim 16, wherein said strap means are integral with said base, and each has an arcuate portion extending therefrom.

22. The clamp of claim 21, wherein said arcuate portion of each said strap means is deformable, to accommodate elongated articles of various dimensions.

23. A clamp comprising a base having a standard means formed therein for at least partially defining a plurality of wells, each adapted to receive an elongated article therein, first strap means connected to a first end of said base for cooperating with said standard means to define at least one of said wells, second strap means connected to the second end of said for cooperating with said standard means to define at least one of said wells, said first and second strap means being adapted to overlie said base and said wells and including coupling means adapted for maintaining said strap means in such overlying position, said coupling means comprises a tongue element on said first strap means including a beveled tongue guide and ratchet teeth portion, and a securing member on said second strap means including a channel and a ratchet pawl therein, said ratchet pawl and said ratchet teeth being adapted to interlock when said tongue element is drawn through the channel.

24. In the clamp of claim 23, wherein said first strap means includes a fastening block with an opening therein and said second strap means includes a fastening block with an opening therein, said openings being adapted to receive a bolt therethrough when said straps are in such overlying position.

* * * * *

UNITED STATES PATENT AND TRADEMARK OFFICE
CERTIFICATE OF CORRECTION

PATENT NO. : 4,024,604
DATED : May 24, 1977
INVENTOR(S) : Boleslaw M. Klimek and Victor Mastis It is certified that error appears in the above-identified patent and that said Letters Patent are hereby corrected as shown below:

Column 2, line 45    before "size" insert -- a --

Column 3, line 4     before "and" first occurrence insert -- 15 --.

Column 3, line 54    "starps" should be -- straps --

Column 4, line 52    "whithin" should be -- within --

Column 6, line 61    after "said" insert -- base --
Claim 23

Signed and Sealed this

*Eleventh* Day of *October 1977*

[SEAL]

Attest:

RUTH C. MASON
*Attesting Officer*

LUTRELLE F. PARKER
*Acting Commissioner of Patents and Trademarks*